US005288448A

United States Patent [19]

Andersson

[11] Patent Number: 5,288,448

[45] Date of Patent: Feb. 22, 1994

[54] METHOD FOR PRODUCING A PACKAGE FOR FLOWABLE SUBSTANCES

[75] Inventor: Par M. Andersson, Lutry, Switzerland

[73] Assignee: Tetra pak Holdings & Finance S.A., Pully, Switzerland

[21] Appl. No.: 913,438

[22] Filed: Jul. 14, 1992

Related U.S. Application Data

[62] Division of Ser. No. 533,925, Jun. 6, 1990, Pat. No. 5,154,342.

[30] Foreign Application Priority Data

Jun. 7, 1989 [CH] Switzerland ........................ 02134/89

[51] Int. Cl.[5] .............................................. B29C 45/14

[52] U.S. Cl. .................................... 264/153; 264/157; 264/268; 264/271.1; 493/74; 493/85; 493/87

[58] Field of Search ............... 264/145, 153, 157, 267, 264/268, 271.1, 275, 279; 493/62, 74, 82, 85, 87

[56] References Cited

U.S. PATENT DOCUMENTS 1,754,496 4/1930 Barker .............................. 264/271.1
2,713,369 7/1955 Strahm ............................... 264/268
3,162,100 12/1964 Rein et al. ............................. 493/87
4,332,577 6/1982 Mosse ..................................... 493/74
4,496,513 1/1985 Ishikawa et al. ..................... 264/267
4,604,850 8/1986 Reil ........................................ 493/85
4,781,012 11/1988 Reil et al. ............................ 264/257

FOREIGN PATENT DOCUMENTS 0241844 7/1988 European Pat. Off. .
2346296 4/1974 Fed. Rep. of Germany ...... 264/267

*Primary Examiner*—Jay H. Woo
*Assistant Examiner*—Robert B. Davis
*Attorney, Agent, or Firm*—Paul & Paul

[57] ABSTRACT

The present invention includes of a method for producing a cross sectionally tetragonal tube package for flowable substances, in particular milk and juices. A carrier material (12) coated with synthetic plastic is cut longitudinally and horizontally through to center (35) and then shaped to form two welds (13,14) which made up the relevant tube (1) of the package. The stepped edge (10) of each web (13,14) serves as the top-end edge (10,16) of the tube (1), the blank (I) of which is separated form the web (13,14) by (at 41) parting it in transverse relationship to their direction of movement (15), the blank being provided with a longitudinal sealing seam for formation of the tube. At the top end of the tube (1), there are formed extensions of oppositely disposed side walls (3,5) and projecting wall panels (8,9) which are folded over into the surface of the top (7), the top (7) being integrally moulded on the free edge (10) of the wall panel (8,9) and the adjacent stepped end edge (10).

9 Claims, 5 Drawing Sheets

Figure 2:
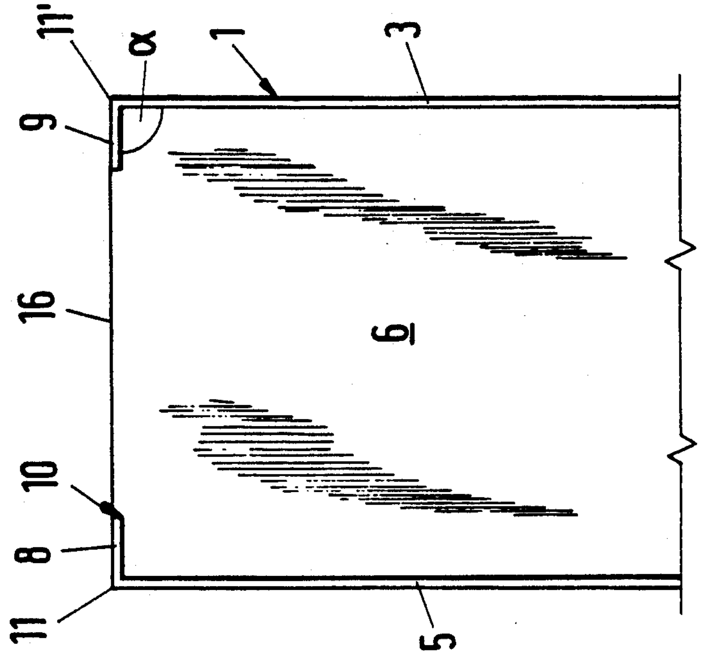

Fig. 3
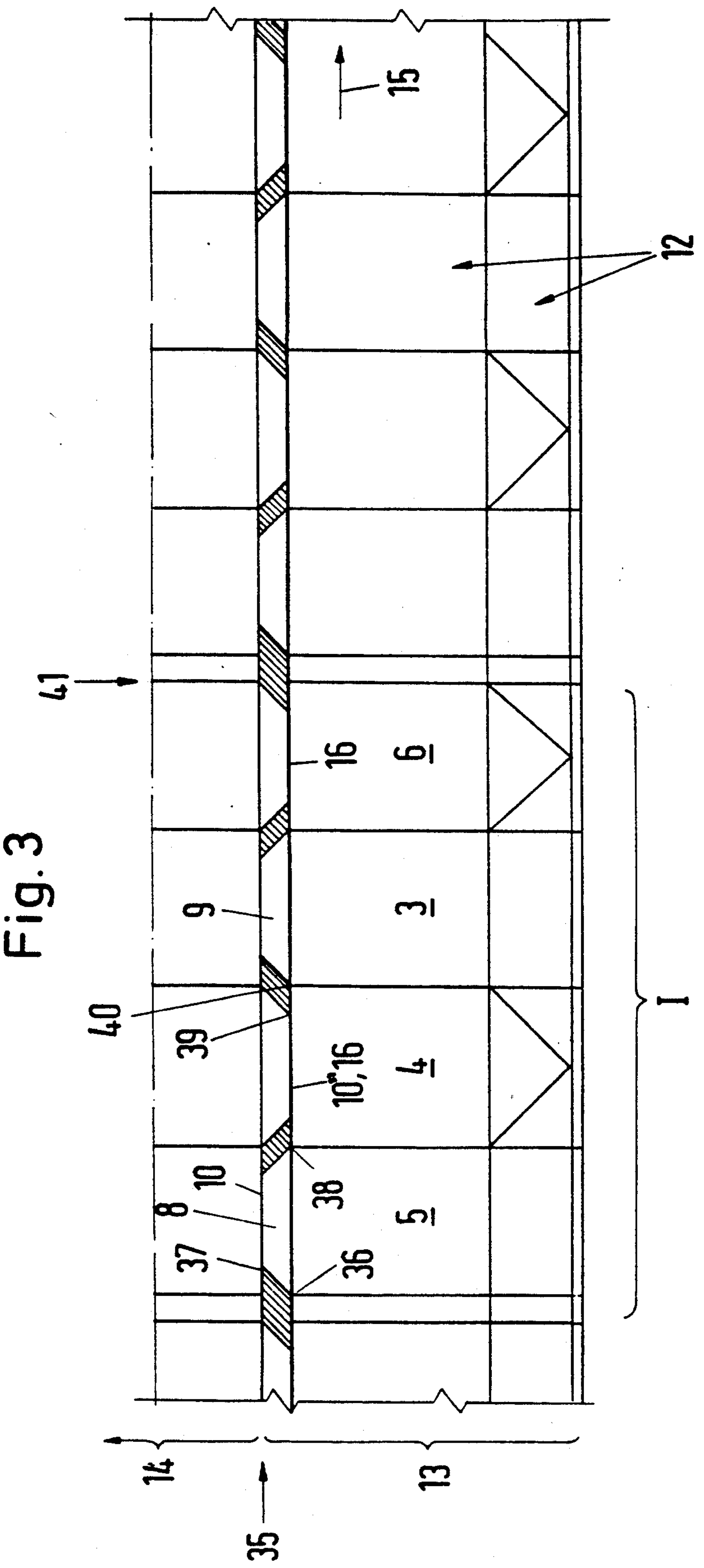
Fig. 4(a)
Fig. 4(b)
Fig. 4(c)

METHOD FOR PRODUCING A PACKAGE FOR FLOWABLE SUBSTANCES

RELATED APPLICATIONS

This case is a divisional application of U.S. Ser. No. 07/533,925 filed on Jun. 6, 1990, now U.S. Pat. No. 5,154,342.

The invention relates to a package for flowable substances, particularly milk and juices, comprising a tube having side walls connected to one another by a longitudinal sealing seam and consisting of a synthetic plastics coated carrier material such as paper or cardboard and with a synthetic plastics top which is integrally moulded onto the end of the tube.

Furthermore, the invention relates to a method of producing such a package, the tube of which is preferably of tetrangular cross-section.

Packages and methods of producing such packages having the aforementioned features are already known. Strip-form material is processed by package-producing machines to form tubes, the bottoms of which are formed from the end material of the tube by folding and the tops off which are integrally moulded on the opposite end of the tube. For this integral moulding, the tube is drawn onto a mandrel which so to speak constitutes the inner mould while from the outside preferably two outer mould jaws are so disposed at a distance above the end face of the mandrel and under an injection moulding unit that a moulding cavity is formed between the outer and inner moulds. Molten synthetic plastics material, preferably a thermoplastics material, is injected into this cavity from the injection moulding unit, the thermoplastics material bonding with the synthetic plastics material on the carrier material at the tube end and producing a fluid-tight rim between the tube and the top.

It has been found that such tops are expediently provided at the same time with an opening device because the injection moulding technology permits of the integral moulding of tabs, gripper rings, lines of weakness on synthetic plastics tops. Opening means are mostly provided with lines of weakness which surround tabs or tongues which can be torn open and for the end user they establish intended rupture lines for opening the package.

The manufacturer of packages of the type mentioned at the outset wishes not only to maintain accurate dimensions of the top wall and also disposition of the opening device in the top but wishes especially to have an exact configuration of the desired rupture or weakness lines, the thickness of which should as far as possible be exactly in proportion to the thickness of the top wall without the tools being too complicated and expensive.

In the case of conventional packages of round or polygonal cross-section, the top was welded onto surfaces the rectilinear extension of which is cross-wise to the plane of the top. This construction and the corresponding manufacture mean that the inner mould, namely the mandrel, and the outer moulds, e.g. two outer mould halves, are freely floating in the end portion where they are opposite one another and form the injection moulding cavity. Therefore, inner and outer moulds of the tool are therefore only brought exactly into position and held there alongside what will subsequently be the product of machine parts from outside. Machine parts always have tolerances and since furthermore carrier materials such as paper or cardboard are never exactly rigid nor of regular thickness but likewise have tolerances, it will be clear to a man skilled in the art that during the operation of injection moulding, i.e. during the injection of molten synthetic plastics material, the injection moulding cavity varies within minimal tolerances. Consequently, batches of product of different thickness result and thus also with lines of weakness or intended rupture lines which are of different strengths.

The invention is based on the problem of avoiding the aforesaid disadvantages while providing a package of the type mentioned at the outset and which retains the favourable properties of sealing-tightness, ease of opening, possibly a reclosure facility and which nevertheless has greater dimensional accuracy in the top area, particularly at the lines of weakness, the intention being so to improve a production method of known type that a more accurate adjustment of the pressure on the synthetic plastics material in the injection moulding cavity between inner and outer mould parts is possible, together with greater dimensional stability of the injection moulded product.

With regard to the product, i.e. the package for flowable substances, this problem is according to the invention resolved in that, at the end of the tube where the top will be, the tube has at least two at least partially mutually oppositely disposed edges which are extended by respective wall panels projecting from the side wall at an angle, the top being integrally moulded on that edge which faces the middle of the top. In contrast to the previously described package in which the rectilinear extension of the surface is at a right-angle to the plane of the top, according to the invention, wall panels are provided as an extension of the tube edge. These wall panels are not situated in planes at right-angles to the plane of the top but are disposed at an angle which is preferably 90° C. These wall panels permit bracing of the inner mould in respect of the outer mould and vice versa. In other words, during production of the new package according to the invention, the inner and outer mould parts of the injection moulding tool no longer have to be braced just by machine parts on a path outside of the product but can be mutually braced via the interposed wall panels. Inner and outer moulds are therefore no longer floatingly disposed in respect of one another since the carrier material, particularly paper, is scarcely compressible or, at least during compression, gives rise to substantially smaller gap tolerances than was hitherto possible with prior art tools, using shoulders, bolts etc. Consequently, even over relatively prolonged running times of the production machine, it is possible to produce packages with tops to closer tolerances. The entire injection moulding process is more accurate when producing the product described according to the invention, because also the adjustment of the pressure of one mould part and the setting of the counter-pressure exerted by the other mould part with the carrier material disposed between them ensures, so to speak, a contact of the mould parts with one another and thus the setting of accurate thicknesses for walls and lines of weakness.

According to the invention, then, it is particularly advantageous if furthermore, the tube part of the package is of tetragonal cross-section and has four flat side walls and if the end edge at the top end of the tube has on two oppositely disposed side walls a wall panel in the form of a narrow tab which is connected to the appropriate side wall via a fold line. As a connecting material between the outer mould and the inner mould, a narrow tab of paper is sufficient so that nothing needs to be changed in respect of the basic configuration of the package, the tube of which is produced at the top end with a top which has no carrier material, so that the advantages of the previous types of package are retained. Indeed, it is possible for the package also to be given a circular cross-sectional form so that the essentially flat top is round and disc-shaped, the wall panels in question serving as intermediate bearings and being trapezoidal, triangular, rectangular, oval, round or in some other shape and can be integrally moulded on the tube edge and provide the desired shaped parts, but a tube of tetrangular cross-section has been found to be extremely favourable for this configuration and for particularly simple tools.

While it was basically possible to dispose on only one of four sides such a wall panel which is angled over to the wall of the tube and to use it within the meaning of the invention, a man skilled in the art will readily appreciate that the disposition of two wall panels in a mutually oppositely disposed region will improve the symmetry of the entire tool. Inner and outer mould parts can be braced symmetrically on one another and jamming or keying effects cannot arise.

Therefore, in a further development of the invention, it is advantageous if on each top-end edge of the four flat side walls a wall panel in the form of a narrow tab is connected to the respective side wall via a fold line. Then the inner mould part is braced in respect of the outer mould part along the entire periphery of the tube end. It is even possible to make the tools even simpler because the injection moulding of synthetic plastics, once the injection moulding cavity has been filled, can only give rise to leakages at the four corners, in other words so to speak only at four points which are incidentally symmetrically disposed.

With regard to this problem, it is particularly favourable if according to the invention the diagonal gap in the plane of the top is filled with synthetic plastics material which engages around the adjacent paper edges and extends at least partially in all three spatial directions beyond the boundaries of the diagonal gap. In the case of the embodiment under review, which has a tube consisting of four flat side walls and wall panels integrally moulded on the top ends, a short diagonal gap is formed between respectively adjacent wall panels, the length of which corresponds substantially to the height of the respective wall panel. In this context, the height is viewed in the direction at right-angles to the tube edge. This diagonal gap extends into the corner at the end edge of the tube and according to the teaching of the invention it should be entirely filled with synthetic plastics material. The tool is so constructed that this elongated synthetic plastics bead fills not only the diagonal gap but also engages around the adjacent paper edges. This provides a rigid connection between adjacent wall panels and the top and at the same time the sealing-tight properties are improved and certainly in the critical corner points of a cross-sectionally tetragonal package. A further strengthening in the corner points is then provided by the extension of this elongated synthetic plastics bead in all three spatial directions beyond the boundaries of the diagonal gap. The man skilled in the art knows that leakages of liquid synthetic plastics material emerging at the paper edges are very difficult to control during injection moulding. The dimensions in the corner are so minimal that without excessive machinery costs, tolerances for controlling these leakages can scarcely be made small enough. Therefore, flow of the synthetic plastics material into the diagonal gap and beyond its boundaries is allowed and then tolerances do not require excessive attention and at the same time a rigid and sealing-tight connection is established between the top and the tube, particularly in the corner areas. The use of simpler tools is the result which is highly appreciated by a man skilled in the art.

With regard to the initially explained method of producing a package for flowable substances, the problem is according to the invention resolved in that a web of synthetic plastics coated carrier material is cut through lengthwise and in steps substantially in the centre and is shaped to form two webs which form the relevant tube of the package, the consequently stepped edge of each web being provided as the top-end edge of the tube, the blank of which is separated from the web by parting the web transversely to its direction of movement and being provided with a longitudinal sealing seam to form a tube and in that two wall panels projecting at the top end of the tube as extensions of oppositely disposed side walls are folded over into the surface of the top, the top being integrally moulded onto the free edge of the wall panel and the adjacent stepped end edge. By reason of this method of production, it is possible to use simple webs of synthetic plastics material with very little material waste and tube lengths can be produced which are at the desired at least partially oppositely disposed sides provided with wall panels by which the inner and outer moulds are intended to be braced during the injection moulding process. Therefore, these wall panels are initially still in the plane of the blank and are then prior to during or after folding over of the individual side walls of the tube folded out of the planes of the side walls. The tube prepared for injection moulding can be pulled onto the mandrel prior to, during or after the wall panels have been folded over in relation to the side walls of the tube and can then be passed under the injection moulding unit. Here, then, the synthetic plastics top with no carrier material is integrally moulded onto the tube. Considering a cross-sectionally tetragonal tube having the aforementioned features, then integral moulding of the top takes place on the one hand on two substantially oppositely disposed wall panels and on the other on the interposed end edges of the tube.

Considering a different embodiment of the invention, then in order to resolve the problem with regard to the method, it should be envisaged that a synthetic plastics coated web of carrier material should be cut through stepwise substantially in the centre and shaped to form two webs which form the relevant tube of the package, the cut forming the bottom edge of a tube or the folded parts of its bottom and also the top edge of the adjacent tube, the blanks of the relevant tube being separated by parting of the web transversely to its direction of movement, the relevant blank being, for forming a tube, provided with a longitudinal sealing seam, for wall panels projecting from the side walls as extensions of the top end of the tube being folded over into the surface of the top, the top being integrally moulded onto the free edge of the wall panel and the adjacently disposed stepped end edge of the tube. In the case of a tetragonal package with four wall panels, this is only possible in the region of the above-described diagonal gap between two wall panels. In the case of this embodiment, therefore, injection moulding takes place so to speak spot-wise at the end edge of the tube. Integral moulding of the synthetic plastics material for forming the top of the package takes place essentially along the free edges of the wall panels which project substantially inwardly towards one another.

Although various embodiments of packages have been suggested which are envisaged as bracing the injection moulds in respect of one another, the relevant tube can be produced from a web of a double row of blanks without any excessive waste having to be accepted.

Instead, it is advantageous if the man skilled in the art, while observing the teachings of the invention, sees that according to the invention, by virtue of the stepped longitudinal cut through the web, parallelogram-like portions of waste of alternating inclination are formed. If the embodiment which was described first is chosen, the one which has only two substantially oppositely disposed wall panels, then the two rows of serially disposed blanks can be so disposed beside one another in the web that the top side of one row of blanks is disposed directly opposite the top side end edge of the other row of blanks. The parts of the tube which when folded form the bottom are therefore disposed so that they point outwardly from the common central line through the web of blanks and the aforesaid parallelogram-shaped waste portions occur in the region of the common cut edge.

If the other embodiment is chosen, which has the four wall panels, so that virtually only the diagonal gaps form a punctiform access to the end edge of the tube, then, paying heed to the teaching according to the invention, the man skilled in the art should see that the stepped longitudinal cut through the web results in the formation of triangular and trapezoidal waste portions. These, too, form in the region of the joint cut edge. With this embodiment, if therefore four wall parts extend the end edges of the tube, then at the joint cut edge of the rows of blanks, located substantially in the middle of the web, the top-end edge of one row will meet the bottom-end edge of the other row. Between these, then, the aforesaid triangular and trapezoidal waste portions will occur, there being more triangular than there are trapezoidal waste portions, preferably in a ratio of 4:1.

Figure 1:
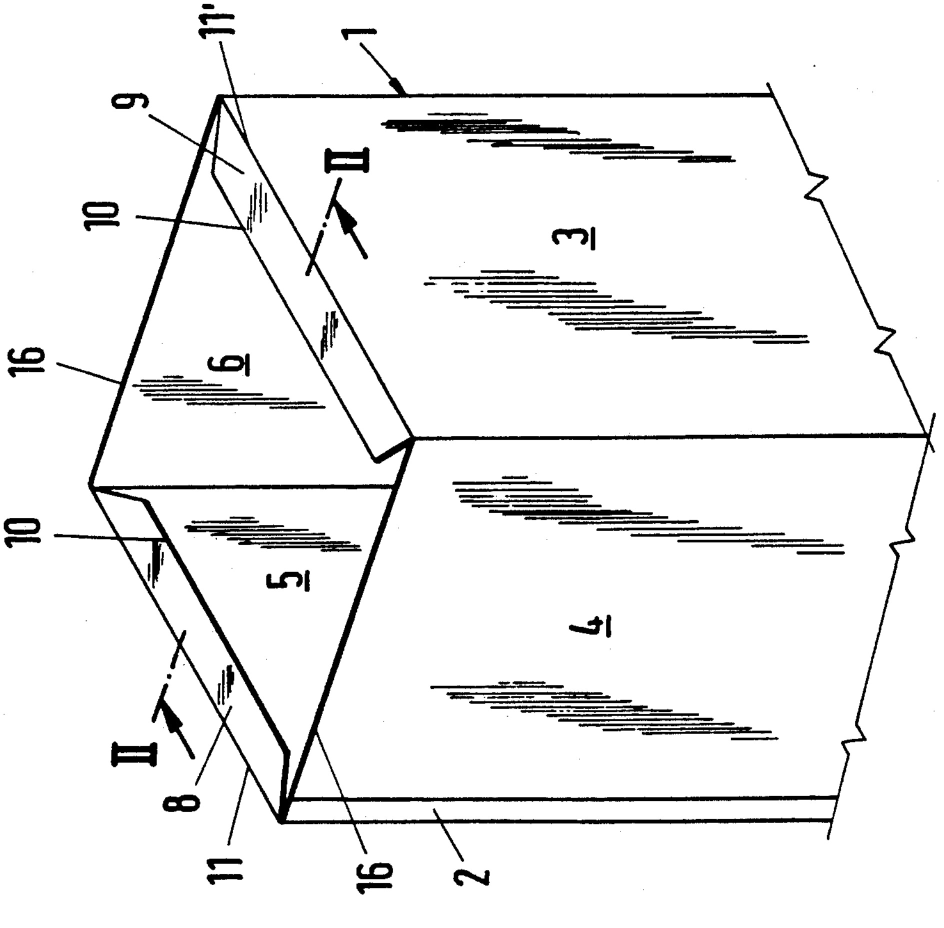
Figure 5:
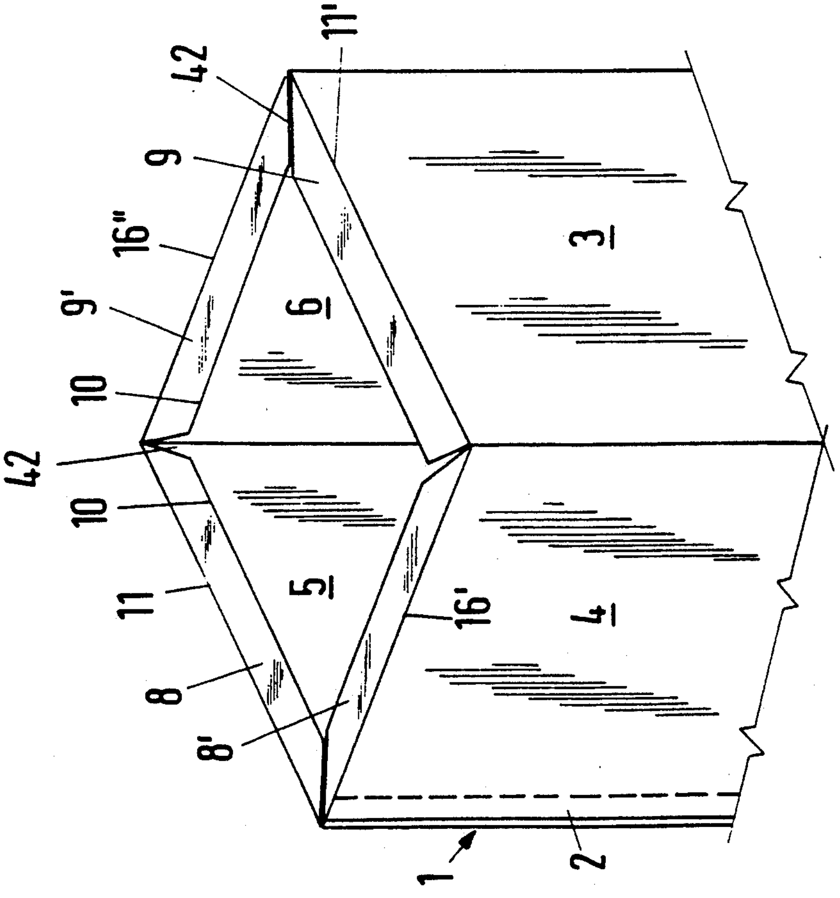
Figure 6:
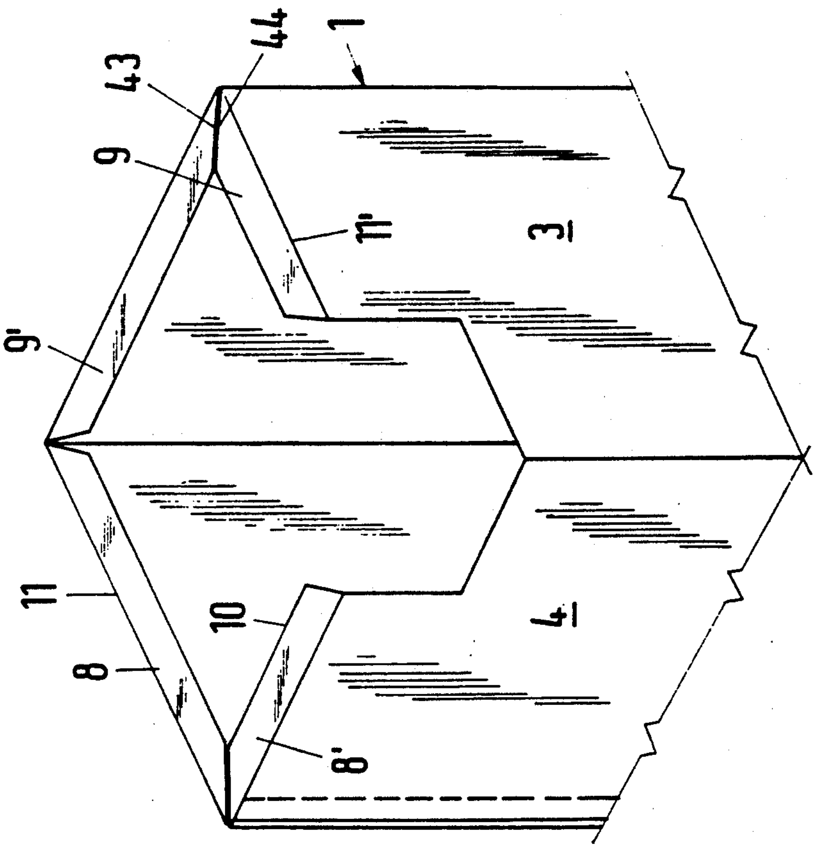
Figures 7, 8A, 8B, 9, 10, 11, 12:
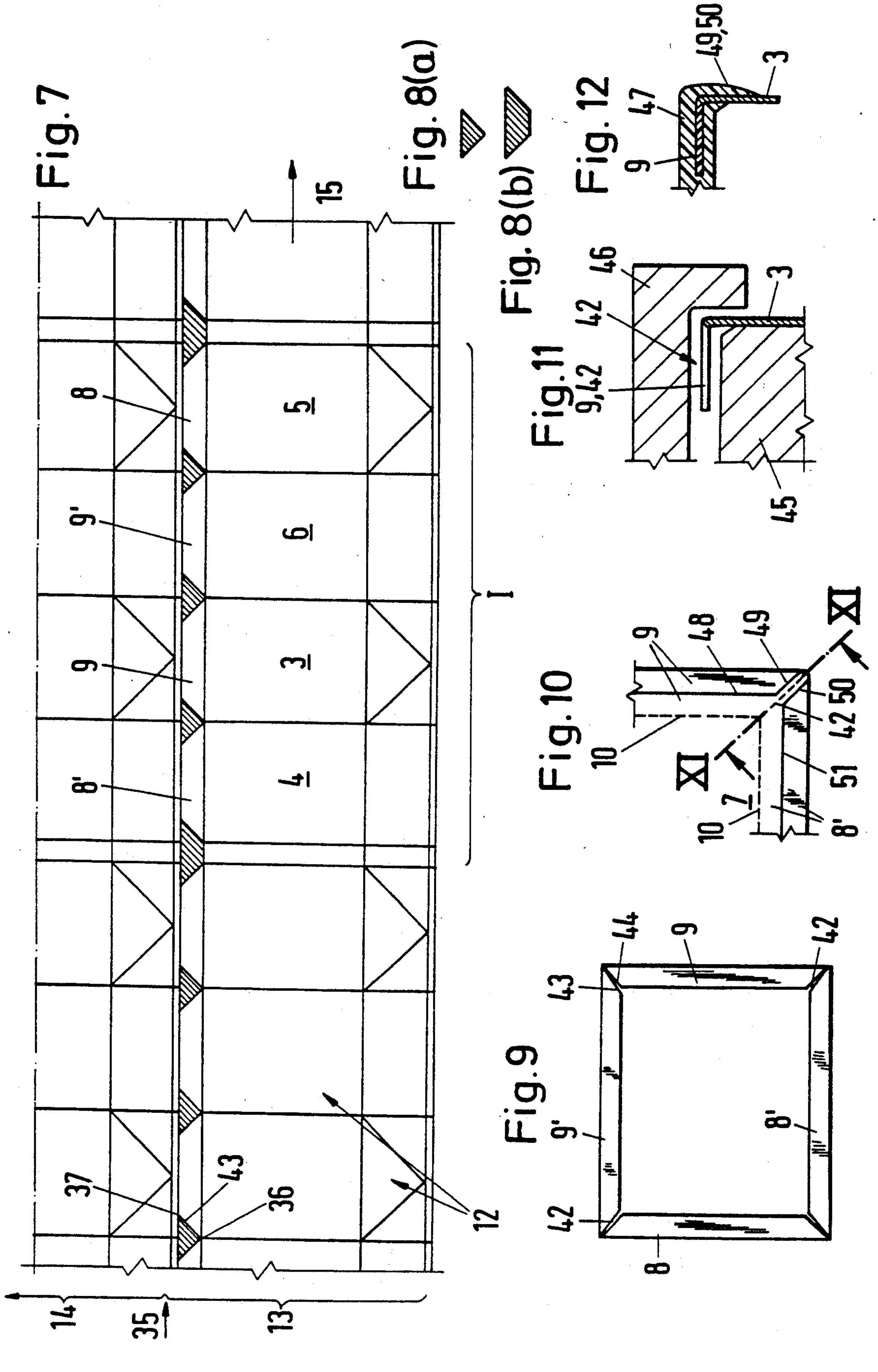
Figure 13:
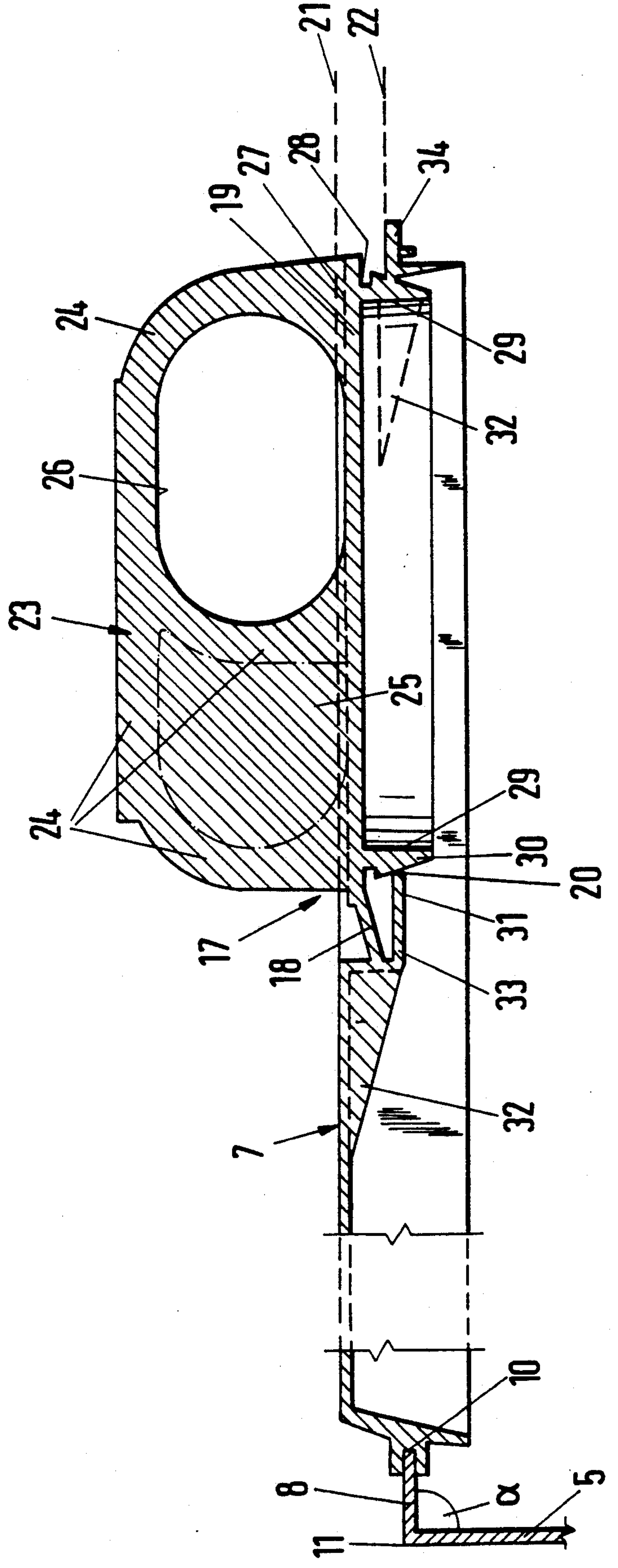

Further advantages, features and possible applications of the present invention will emerge from the following description of preferred examples of embodiment, taken in conjunction with the attached drawings in which:

FIG. 1 shows a perspective view of the upper part of a cross-sectionally tetragonal tube with two oppositely disposed wall panels in the form of narrow tabs, FIG. 2 is a diagrammatic cross-sectional view, broken away at the bottom, through the tube in FIG. 1 taken on the line II—II in FIG. 1, FIG. 3 shows a double-row web of blanks for producing a tube according to FIG. 1 or 2, FIG. 4(*a*)-4(*c*) shows waste portions from the production of the blanks for a tube according to FIG. 1 from webs according to FIG. 3, FIG. 5 shows a different embodiment of package tube in a view similar to that in FIG. 1 but in this case with four oppositely disposed wall panels on a cross-sectionally tetrangular tube, FIG. 6 shows another and further embodiment of the top-side end edge of the tube with four substantially mutually oppositely disposed wall panels, but with, in the corner facing the observer, a cut-away portion in which it is possible integrally to mould appropriate pouring means using a tool, not shown, FIG. 7 is a web of blanks for producing a tube according to FIG. 5, FIG. 8(*a*)-8(*b*) shows the waste portions occurring when producing the tube according to FIG. 5 from the web according to FIG. 7, FIG. 9 is a plan view of the tube in FIG. 5 with four mutually oppositely disposed wall panels, FIG. 10 is a broken-away and enlarged detailed view of one corner at the top-side end of the tube, where two adjacent wall panels form a diagonal gap, FIG. 11 is a cross-sectional view through the diagonal gap in FIG. 10 taken on the line XI—XI in FIG. 10, in fact as a vertical section when the package tubes according to FIGS. 1, 2, 5 and 6 are assumed to be standing upright so that their side walls lie in vertical planes, FIG. 12 diagrammatically shows a broken-away vertical cross-section through the end edge of the tube with synthetic plastics material moulded around it and with the wall panel in the diagonal gap and FIG. 13 shows a top.

The completed package for flowable substances is not shown in any of the drawings because similar packages are known, even though they do not have the wall panels explained hereinafter. For clearer illustration of the invention, reference is made here to a tube 1 of a liquids package of quadratic cross-section. After being folded over along its four vertical fold lines, the resulting plane side walls 3, 4, 5 and 6 are connected to one another by heat sealing along a longitudinal sealing seam 2. This produces the parallelepiped tube 1 shown in perspective views in FIGS. 1, 5 and 6 with the upper end, where the top is situated.

The tube is sealed by the top 7, as shown in FIG. 13. The top wall generally designated 17 consists of an opening tab 19 fitted on a hinge 18 and connected to the top wall 17 via an endless line of weakness 20. The outer surface of the top 7 lies in a first outer plane 21, while the surface in which the line of weakness 20 is situated establishes an inner second plane 22. The pouring means comprise a gripper tab 23 disposed at right-angles to the plane 21 or to the second plane 22 below it. The gripper tab 23 consists of pull and connecting rings 24, an infill membrane 25 and a gripper aperture 26.

The root of the gripper tab 23 is integrally moulded on the flat wall 27 of the opening tab 19, a rim 28 protruding outwardly to form a closure brace.

The opening tab 19 is elongated if one were to be looking downwards in FIG. 13. From the flat wall 27 of the opening tab 19, a collar 29 projects downwardly, diverging outwardly and obliquely upwardly, as shown at 31. An outer bottom part 30 forms thereby the narrower end and reinforcing ribs 32 make a thin construction possible both with regard to the upper wall 27 and also the lower wall 33. Finally, the pouring edge of the pourer orifice is designated 34 and is situated in the front as an extension of the lower wall 33.

The particular feature of the tube 1 of which the upper part is shown broken away, according to FIGS. 1, 2, 5 and 6, are oppositely disposed wall panels 8, 9 (FIGS. 1 to 3) or additionally the further oppositely disposed wall panels 8', 9' (in FIGS. 5 to 7 and 9).

In the case of the embodiment shown in FIGS. 1 to 3, it is only on the oppositely disposed side walls 3 and 5 that wall panels 9 and 8 are shown as being attached along fold edges 11' and 11, while the tube 1 has on its side walls 4 and 6 edges 16 which are situated at the top end. At the edges 10 of the two mutually opposite wall panels 8 and 9 which are towards the middle of the top 7, the part of the wall panel 8 which projects outwardly and downwardly from the upper top wall 27 engages around the wall panel 8 as shown by the broken-away left-hand end in FIG. 13. Similarly, the construction may be made at the opposite end. Certainly, if the pourer orifice 17 is disposed in one corner of the package such as for example in FIG. 6, where it is shown as a cut-away part facing the viewer, then a different mounting on the side wall 3 and 4 underneath the pourer edge 34 is possible in per se known manner.

The side walls 3 to 6 of the tube 1 are therefor extended at the top end and are extended by at least two oppositely disposed wall parts 8 and 9 (FIGS. 1 to 3) which, folded over, project at an angle $\alpha$ of preferably about 90° in relation to the adjacent side wall 5, 3, being folded along the lines 11, 11'. In the case of the other embodiment shown in FIGS. 5 to 7 and 9, the tube 1 is provided with wall panels 8, 8', 9, 9' on all four side walls 3 to 6 and these are folded over about the corresponding fold lines 11, 16' or 11', 16''. The wall panels 8, 8', 9, 9' take the form of narrow tabs because this makes it possible to save material particularly when producing the blank. The same also applies for cross-sectionally round packages in which, as is not shown here, small triangular tabs take over the function of the wall panels.

FIGS. 3 to 7 show broken-away views of a synthetic plastics coated web 12 of carrier material, consisting of two webs 13 and 14 and passed through the processing machine for example in the direction 15. Substantially in the middle 35, the two webs 13, 14 are separated from each other by a stepped cut in such a way that only the areas which are shown shaded in FIGS. 3, 4, 7 and 8 represent wastage.

For the embodiment of a tube according to FIGS. 1 and 2, if one considers the production of blanks according to FIGS. 3 and 4, then the stepped middle cut commences for example at the location 36, runs upwardly to the location 37, from there passing rightwards parallel with the direction 15 of conveyance at the outer end or the edge 10 of the wall panel 8 which is towards the top and then down along the left-hand edge of the leftwardly sloping parallelogram as far as the location 38, thence along a line 10'' rightwards as far as the location 39 and at the same time also as far as the location 40 because this means that the rightwardly sloping parallelogram constitutes the waste material, in order finally to encircle the nearest wall panel 9 of the side wall 3, and rightwardly in the direction of the arrow 15 in a corresponding manner. Thus, in the case of the web 12 shown in FIG. 3, one blank I after the other is formed with all panels 8 and 9 while at the same time the cut forms or stamps out corresponding wall panels on the oppositely disposed web 14. The individual blank I is separated from the next blank by parting the webs 13, 14 transversely of their direction 15 of movement and at the location 41. Therefore, with one cut through both webs 13 and 14, in each case two blanks are formed. The bottom-end configuration and the disposition of the fold lines are not described here.

In FIG. 4, under a) are shown the larger parallelogram-like waste portions in the region of what will subsequently be the sealing seam 2, under b) the leftwardly sloping parallelogram-like waste portions and under c) the rightwardly sloping parallelogram-like waste portions which in proportion to the overall web represent a negligible fraction of the material, which means that production is economical.

Very similarly but even more simply the stepped cut extends through the middle 35 of the two webs 13 and 14 in FIG. 7. It can be seen that the separating cut consists of a straight line at the height of the centre 35 and stamping fields adjacent to it, which are shown shaded and which take the form of triangles or trapezoidal shapes with the relevant narrower or pointed end downwards. In other words, in the case of the web 13, the height of the wall panels 8, 9, 9', 8 is equally upwards as with the next web 14 which follows on upwards, so producing the described straight pattern of the cut along the middle 35. The trapezoidal waste portions according to FIG. 8*b* are stamped out in the region of what will subsequently be the longitudinal sealing seam 2, and wherever what will later be the longitudinal fold lines of the tube extend between the side walls 3 to 6, that is where the points of the triangular waste portions shown in FIG. 8*a* will be located.

If a blank is prepared from a web 12 according to FIG. 7 through the longitudinal and transverse cuts and if it is then sealed along the longitudinal sealing seam 2, then the result is the embodiment shown in FIG. 5, the additional particular feature according to FIG. 6 representing in fact the cut-away part intended for a pourer orifice and disposed in the front at the corner facing the viewer.

Whereas in the case of the embodiment shown in FIGS. 1 and 2, injection moulding of the top 7 on the tube 1 takes place on the free edge 10 of the wall panel 8, 9 and on the adjacent top-end edge 17 which is stepped in respect thereof, where the other embodiment shown in FIG. 5 is concerned it takes place along the free edges 10 of the four wall panels 8, 8', 9, 9' and along the diagonal gap 42.

This gap 42 is formed by the adjacent paper edges of which FIGS. 6 and 9 only show for example the edges 43 and 44 of the adjacent wall panels 9, 9'. In the view in FIG. 10, these two paper edges 43, 44 coincide in the broken line of the diagonal gap 42 (in an ideal situation). FIG. 7 illustrates a paper edge 43 between the two locations 36 and 37 alongside the triangular waste portion (FIG. 8*a*).

While the top 7 is being injection moulded onto the free end edges 10 of the four tab-like wall panels 8, 8', 9, 9', the still liquid synthetic plastics material flows into the space between the inner injection mould part 45 and the outer injection mould part 46 shown in FIG. 11 and the cross-sectional view of which is shown here prior to injection moulding and is taken on the line XI—XI in FIG. 10. The resultant injection moulding space is shown in an exaggerated form in order to be able when representing the resulting cross-section as in FIG. 12, to show how the synthetic plastics material 47 is forced into the diagonal gap 42 and runs out both on the inside and also the outside over a certain region, where it solidifies. This produces a sealing-tight connection also between the adjacent paper edges 43 and 44 in the diagonal gap 42, the connection making the package more rigid. In plan view, FIG. 10 shows at the top the top member 7 the synthetic plastics material of which extends as far as the line 48, 49, 50 and then farther downwardly on the left to 51, the entire area in the diagonal gap 42 being covered as can be seen from the top right-hand part of FIG. 12. For the rest, the wall panels 9, 8' are only about half covered because the broken lines 10 represent the paper edge or, to be more precise, the edge 10 of the relevant wall panel 8, 8', 9, 9' which is towards the middle of the top 7.

Particularly the view in FIGS. 10 to 12 shows how upon injection moulding of the top in the case of the embodiment of tube with the four tab-like wall panels 8, 8', 9, 9' the synthetic plastics material 47 flows not only into the diagonal gap 42, engaging thereby around the adjacent paper edges 43 and 44 of the directly adjacent tab-like wall panels 9, 9', but also extends out in all the other three spatial directions, so that in the plan view in FIG. 10 it passes so far beyond the boundaries of the diagonal gap 42 that it only stops flowing at the lines 48, 49, 50, 51, i.e. it sets along these boundary lines.

I claim:

1. A method for the production of a package for the containment of flowable substances comprised of four flat side walls, a bottom and a top with a pouring means comprising:

a) forming a continuous web of synthetic plastic coated material that is performed with equally spaced folding seams that are transverse to the length of the web;

b) longitudinally cutting said web substantially in the center to form two identical webs with a top and a bottom;

c) cutting each web transversely along every predetermined fourth folding seam to produce a container blank;

d) folding each blank at each one of the four folding seams to form an open-ended, four-sided tetragonal tube which is joined at both ends by a longitudinal sealing seam;

e) folding at least two of the top portions of oppositely disposed side walls to produce at least two oppositely disposed side wall panels;

f) folding over the bottom portions of said side walls to form a bottom, and;

g) integrally molding a plastic top and pouring means onto the free edges of the oppositely disposed side wall panels.

2. The method of claim 1 wherein the top portion of all four side walls are folded to create four equally sized side wall panels.

3. The method of claim 2 wherein said pouring means is a pourer spout.

4. The method of claim 3 wherein said plastic coated material is selected from the group consisting of cardboard, paper and mixtures thereof.

5. The method of claim 4 wherein said pourer spout top is injection molded onto the side wall panels.

6. The method of claim 5 wherein said injection molded top includes a handle device.

7. The method of claim 6 wherein said pourer spout further comprises a reclosure device.

8. The method of claim 7 further comprising cutting a diagonal gap at each of the corners formed by the junction of two side walls and subsequently injection molding a pourer spout therein.

9. The method of claim 8 further comprising forming a cut-away opening at the top of the container at one of the junctions of two side wall panels.

* * * * *